(12) United States Patent
Kitamura et al.

(10) Patent No.: US 10,174,128 B2
(45) Date of Patent: Jan. 8, 2019

(54) METHOD FOR PRODUCING PURIFIED LOW-SUBSTITUTED HYDROXYPROPYL CELLULOSE

(71) Applicant: Shin-Etsu Chemical Co., Ltd., Tokyo (JP)

(72) Inventors: Akira Kitamura, Joetsu (JP); Atsuhiko Yonemochi, Joetsu (JP); Mitsuo Narita, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 47 days.

(21) Appl. No.: 14/079,704

(22) Filed: Nov. 14, 2013

(65) Prior Publication Data

US 2014/0142293 A1 May 22, 2014

(30) Foreign Application Priority Data

Nov. 16, 2012 (JP) .................................. 2012-252191

(51) Int. Cl.
*C08B 11/02* (2006.01)
*C08B 1/08* (2006.01)
*C08B 11/08* (2006.01)

(52) U.S. Cl.
CPC ............... *C08B 1/08* (2013.01); *C08B 11/08* (2013.01)

(58) Field of Classification Search
CPC .................................. C08B 1/08; C08B 11/08
USPC ..................................................... 536/95, 56
See application file for complete search history.

(56) References Cited

U.S. PATENT DOCUMENTS

| | | | |
|---|---|---|---|
| 4,091,205 A | 5/1978 | Onda et al. | |
| 4,449,227 A | 5/1984 | Osako | |
| 4,537,958 A | 8/1985 | Strange et al. | |
| 4,963,271 A | 10/1990 | Raehse et al. | |
| 6,680,069 B1 * | 1/2004 | Obara | .......................... 424/451 |

FOREIGN PATENT DOCUMENTS

| | | |
|---|---|---|
| EP | 1 099 709 A1 | 5/2001 |
| EP | 1 120 427 A1 | 8/2001 |
| EP | 2 075 260 A1 | 7/2009 |
| EP | 2 567 984 A1 | 3/2013 |
| JP | 57-53100 | 3/1982 |
| JP | 61-34001 | 2/1986 |
| JP | 64-70502 | 3/1989 |
| JP | H10-265501 A | 10/1998 |
| JP | 2000302802 A * | 10/2000 |

OTHER PUBLICATIONS

Maruyama et al.; JP2000302802 A; Oct. 31, 2000 (Machine-English Translation).*
Extended European Search Report from corresponding European Patent Application No. 13192381.5 dated Jan. 2, 2014.

* cited by examiner

*Primary Examiner* — Shaojia A Jiang
*Assistant Examiner* — Michael C. Henry
(74) *Attorney, Agent, or Firm* — Alston & Bird LLP

(57) ABSTRACT

Provided is a method for producing low-substituted hydroxypropyl cellulose with less yellowing. More specifically, the method for producing purified low-substituted hydroxypropyl cellulose includes the steps of: reacting alkali cellulose and an etherifying agent to obtain a reaction mixture; dispersing the reaction mixture in water containing a portion of acetic acid necessary for neutralizing the total amount of the reaction mixture to neutralize a portion of the reaction mixture, and then completely neutralizing with the remaining acetic acid to cause precipitation, to obtain a slurry containing crude low-substituted hydroxypropyl cellulose; disintegrating a solid component in the slurry through a cutter pump, the solid component containing the crude low-substituted hydroxypropyl cellulose, and discharging the slurry containing the disintegrated solid component; washing the discharged slurry with water to obtain a cake of purified low-substituted hydroxypropyl cellulose; and drying the cake.

5 Claims, 2 Drawing Sheets

METHOD FOR PRODUCING PURIFIED LOW-SUBSTITUTED HYDROXYPROPYL CELLULOSE

FIELD

The present invention relates to a method for producing purified low-substituted cellulose ether to be used in chemical fields, pharmaceutical fields and the like.

BACKGROUND

Low-substituted hydroxypropyl cellulose insoluble in water but soluble in an aqueous alkali solution is produced in a method of partially dissolving the low-substituted hydroxypropyl cellulose, by partially neutralizing, in water, alkali hydroxide used as a reaction catalyst after completion of an etherification reaction (Japanese Patent Application Examined Publication No. 57-53100).

In a purification step for obtaining water-soluble cellulose ether or cellulose ether, a centrifugal pump making use of the rotation of an impeller for increasing a lifting height is used for transfer of a slurry of crude water-soluble cellulose ether or crude cellulose ether, which has been dispersed in water for slurrying, after an etherification reaction.

As another means, a volume type rotary pump is used which never gives an excessive shear force to solid particles in the slurry during transfer of the slurry (Japanese Patent Application Unexamined Publication No. 61-34001). In order to efficiently mix the reaction liquid of produced hydroxypropylmethyl cellulose phthalate or hydroxypropylmethyl cellulose acetate succinate with water for industrially producing cellulose derivate particles, a cutter pump is employed (Japanese Patent Application Unexamined Publication No. 64-70502).

SUMMARY

In the neutralization method according to Japanese Patent Application Examined Publication No. 57-53100, when an amount of an acid used for partial neutralization is small, solid particles in the crude low-substituted hydroxypropyl cellulose slurry inevitably have gelled surfaces after neutralization. The gelled surface inhibits the transfer of a yellowing-causing substance, making it difficult to extract the yellowing-causing substance in a purification step. As a result, the low-substituted hydroxypropyl cellulose thus obtained turns yellow.

The low-substituted hydroxypropyl cellulose is insoluble in water and has a characteristic property, that is, excellent water retention compared with water-soluble cellulose ether. Accordingly, the low-substituted hydroxypropyl cellulose retains a large amount of water containing a yellowing-causing substance, which makes it very difficult to remove the yellowing-causing substance in the purification step.

In order to more efficiently extract a yellowing-causing substance within the gel from the solid particles having gelled surfaces, it is necessary to physically disintegrate the gelled portion of the solid particles. Insufficient disintegration of the gelled portion prevents sufficient removal of the yellowing-causing substance. On the other hand, excessive disintegration of the gelled portion leads to extension of the time of a purification step because the resistance of miniaturized solid particles to filtration results in increase in filtration time.

Particularly, in the production of cellulose having excellent water retention such as low-substituted hydroxypropyl cellulose, a dehydration step accounts for a large proportion of the total time of the production steps of the low-substituted hydroxypropyl cellulose.

The present inventors have carried out an extensive investigation to overcome the above-mentioned problems. As a result, they have found that a yellowing-causing substance can be removed sufficiently in a purification step by disintegrating a solid component in a slurry, the solid component containing crude low-substituted hydroxypropyl cellulose which is obtained by partial neutralization with an acid and which is dispersed in water. In particular, they have found that by regulating an average particle size of the solid component in the slurry after the disintegration step, the solid component does not become excessively fine and the time of a purification step can be shortened. As a result, they have achieved a production method of purified low-substituted hydroxypropyl cellulose according to the invention.

According to the invention, provided is a method for producing purified low-substituted hydroxypropyl cellulose, comprising the steps of: reacting alkali cellulose and an etherifying agent to obtain a reaction mixture; dispersing the reaction mixture in water containing a portion of an acid necessary for neutralizing the total amount of the reaction mixture to partially neutralize the reaction mixture to cause partial precipitation, and completely neutralizing with the remaining acid to cause precipitation, to obtain a slurry containing crude low-substituted hydroxypropyl cellulose; disintegrating a solid component in the slurry through a cutter pump, the solid component containing the crude low-substituted hydroxypropyl cellulose, and discharging the slurry containing the disintegrated solid component; washing the discharged slurry with water to obtain a cake of purified low-substituted hydroxypropyl cellulose; and drying the cake.

The invention makes it possible to provide low-substituted hydroxypropyl cellulose with less yellowing, while decreasing the time spent for a purification step.

DETAILED DESCRIPTION

Figure 1:
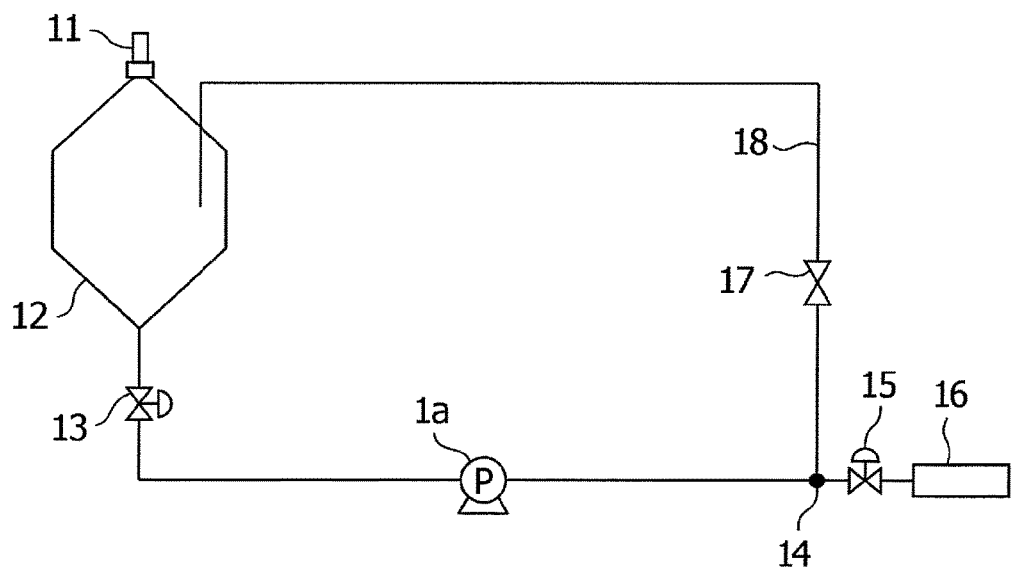
FIG. 1 is a schematic view showing one embodiment of an apparatus for producing purified low-substituted hydroxypropyl cellulose according to the invention.

The invention will hereinafter be described in detail.

Alkali cellulose can be obtained preferably by a general production method comprising the steps of: bringing a raw material pulp into contact with an alkali metal hydroxide solution and dehydrating the product thus obtained.

Examples of the step of bringing a raw material pulp into contact with an alkali metal hydroxide solution include direct and dropwise addition of or spray of the alkali metal hydroxide solution to the raw material pulp; or immersion of the raw material pulp in the alkali metal hydroxide solution, followed by compression of the resulting pulp to remove the excessive alkali metal hydroxide solution.

Examples of the raw material pulp include a wood pulp and a linter pulp. The pulp in any form such as sheet and pulverized powder can be used without limitation. The degree of polymerization of the pulp can be selected appropriately, depending on the target viscosity of cellulose ether.

The alkali metal hydroxide solution is not particularly limited insofar as alkali cellulose can be obtained therefrom. It is preferably an aqueous solution of sodium hydroxide or potassium hydroxide. An aqueous solution of sodium hydroxide is particularly preferred from the economical viewpoint. The concentration of the alkali metal hydroxide solution is preferably from 20 to 60% by weight, particularly preferably from 30 to 40% by weight. When the concentration of the alkali metal hydroxide solution is less than 20% by weight, an etherification reaction may not progress sufficiently. When the concentration of the alkali metal hydroxide solution is more than 60% by weight, the obtained alkali cellulose may have a non-uniform composition and prevent uniform depolymerization.

The alkali cellulose product obtained by the contact comprises the alkali cellulose, the alkali metal hydroxide and water.

With regard to the composition of the alkali cellulose product most suited for a reaction with an etherifying agent, in the direct and dropwise addition of or the spray of the alkali metal hydroxide solution to the raw material pulp, a weight ratio of the alkali metal hydroxide to the cellulose in the alkali cellulose is preferably from 0.1 to 0.6, more preferably from 0.2 to 0.45; and a weight ratio of water to the cellulose in the alkali cellulose is preferably from 0.3 to 1.5, more preferably from 0.45 to 1.0. In the immersion of the raw material pulp in the alkali metal hydroxide solution, followed by the compression of the resulting pulp to remove the excessive alkali metal hydroxide solution, the weight ratio of the alkali metal hydroxide to the cellulose in the alkali cellulose is preferably from 0.1 to 1.0, more preferably from 0.2 to 0.8; and the weight ratio of water to the cellulose in the alkali cellulose is preferably from 0.1 to 2.0, more preferably from 0.3 to 1.0. When respective amounts of the alkali metal hydroxide and water relative to the amount of the cellulose in the alkali cellulose are smaller than the above-mentioned ranges, an etherification reaction may not progress sufficiently so that industrial efficiency may be lowered. When respective amounts of the alkali metal hydroxide and water relative to the amount of the cellulose in the alkali cellulose are greater than the above-mentioned ranges, the amount of impurities generated during the reaction may increase, making it difficult to obtain a product having a desired degree of hydroxypropyl substitution.

After preparation of the alkali cellulose, a reaction vessel is purged with an inert gas (preferably, with nitrogen or helium). This makes it possible to reduce the oxygen concentration in the reaction vessel during the subsequent etherification reaction and conduct an etherification reaction safely. In addition, by purging the reaction vessel with an inert gas to keep the oxygen amount in the reaction vessel at a predetermined level or less, purified low-substituted hydroxypropyl cellulose having few variation in viscosity can be produced.

The reaction between the alkali cellulose and an etherifying agent is conducted by mixing them sufficiently in the reaction vessel.

The etherifying agent is not particularly limited insofar as substitution of a hydroxypropoxy group is conducted. It is preferably propylene oxide from the economical point of view.

A molar ratio of the etherifying agent to the cellulose in the alkali cellulose is preferably from 0.3 to 3.0. When the amount of the etherifying agent such as propylene oxide is less than 0.3 or more than 3.0 in the molar ratio, substitution of a predetermined amount of a hydroxypropoxy group may not be obtained.

The reaction temperature between the alkali cellulose and the etherifying agent is preferably from 30° C. to 80° C., more preferably from 50° C. to 70° C. When the reaction temperature is less than 30° C., it may take long time for the etherification reaction, which may be economically disadvantageous. When the reaction temperature is more than 80° C., substitution of hydroxypropoxy groups may be in an amount greater than desired. The reaction time is preferably from about 1 to 5 hours. The etherifying agent can be added by any of the following methods: a method of adding a predetermined amount of the etherifying agent to a reaction vessel at once, a method of adding it to a reaction vessel in several portions, a method of continuously adding it to a reaction vessel within a predetermined period of time, and other methods.

A substance causing yellowing has not yet been identified. A yellowing-causing substance is presumed to be generated during the etherification reaction step because the crude low-substituted hydroxypropyl cellulose after the etherification reaction step has turned yellow compared with the alkali cellulose before the etherification reaction.

The yellowing-causing substance is soluble in water so that it can be removed by extracting with water in the purification step (washing and, optional dehydration and/or optional compression).

The hydroxypropoxyl content of the low-substituted hydroxypropyl cellulose is preferably from 5 to 16% by weight, particularly preferably from 7 to 13% by weight. When the content is less than 5% by weight, the swelling ratio of the hydroxypropyl cellulose may decrease, and tablets or the like obtained by using such a product may have an insufficient disintegration property. When the content is more than 16% by weight, the resulting hydroxypropyl cellulose may become soluble in water at last. The hydroxypropoxyl content in the low-substituted hydroxypropyl cellulose can be measured using a method listed in the Japanese Pharmacopoeia Sixteenth Edition.

After the etherification reaction, the crude low-substituted hydroxypropyl cellulose is partially precipitated by placing water and a portion of an acid necessary for neutralizing the total amount of the etherification reaction product in known apparatus such as a kneader type mixer or a vertical mixer, adding the etherification reaction product into the apparatus, and mixing them for a predetermined time to partially neutralize the reaction product. Then, complete neutralization is conducted with the remaining acid to partially precipitate the crude low-substituted hydroxypropyl cellulose. The partial neutralization method is suited for producing low-substituted hydroxypropyl cellulose having controlled apparent specific gravity.

Neutralization temperature is not particularly limited. The neutralization temperature may be room temperature without heating, or from 30 to 80° C. by heating. As the water, hot water of from 35 to 65° C. is preferred.

The weight of the water for neutralizing the low-substituted hydroxypropyl cellulose is preferably from 2 to 50 times, more preferably from 2 to 20 times, particularly preferably from 4 to 10 times as much as the weight of the cellulose in the etherification reaction product. When the weight of water used for neutralization is less than 2 times as much as the weight of the cellulose, the solution of the product may have a high viscosity, making it difficult to uniformly mix the low-substituted hydroxypropyl cellulose. At the same time, most of the solid particles of the low-substituted hydroxypropyl cellulose after neutralization may inevitably have gelled surfaces. When the weight of water used for neutralization is more than 50 times as much as the weight of the cellulose, an apparatus necessary for neutralization should have a correspondingly large size and at the same time, the purified product obtained by dehydration may have high water content.

Supposing that the amount of the acid necessary for neutralizing the entire amount of the alkali metal hydroxide solution is 100% by weight, the amount of the acid used for partial neutralization of the low-substituted hydroxypropyl cellulose is preferably from 3 to 40% by weight, particularly preferably from 8 to 30% by weight. When the amount of the acid is less than 3% by weight of the amount of the acid necessary for neutralization of the entire alkali metal hydroxide solution, the particles may have gelled surfaces after completion of the neutralization because a large amount of the alkali metal hydroxide remains and a partial precipitation amount of the cellulose ether is too small. This inhibits the transfer of a yellowing-causing substance and makes the washing step difficult. When the amount of the acid is more than 40% by weight, a partial precipitation amount of the cellulose ether may increase, and fibers derived from the raw material pulp may remain in the product as they are, thereby deteriorating the fluidity of the powders.

The mixing time after the addition of a portion of the acid is preferably from 5 to 120 minutes, particularly preferably from 10 to 80 minutes. When the partial neutralization time is less than 5 minutes, partial neutralization of the low-substituted hydroxypropyl cellulose may be insufficient. When the time is more than 120 minutes, the production time of the low-substituted hydroxypropyl cellulose may be extended.

After the partial neutralization, the total amount of the remaining acid is added and mixed for a predetermined time to achieve complete neutralization and precipitate the crude low-substituted hydroxypropyl cellulose. The mixing time after the addition of the acid is preferably from 5 to 60 minutes, particularly preferably from 10 to 30 minutes. When the mixing time after the addition of the acid is less than 5 minutes, uniform mixing of the acid may be prevented. When the mixing time is more than 60 minutes, the production time of the low-substituted hydroxypropyl cellulose may be extended.

The acid to be used for neutralizing the total amount of the alkali metal hydroxide solution is not particularly limited and any acid can be used. Examples of the acid include an organic acid such as acetic acid, formic acid and propionic acid, and an inorganic acid such as hydrochloric acid and sulfuric acid. The concentration of the acid is not particularly limited and can be selected freely. It is preferably from 10 to 50% by weight, particularly preferably from 20 to 40% by weight.

FIG. 1 shows one embodiment of an apparatus used in the production method according to the invention. The crude low-substituted hydroxypropyl cellulose after neutralization of the total amount of the alkali metal hydroxide solution is dispersed in water for slurrying in a vessel such as a slurry tank 12. At this time, the water for slurrying is preferably from 20 to 100° C., particularly preferably from 40 to 80° C. The concentration of the crude low-substituted hydroxypropyl cellulose in the slurry is preferably from 2 to 15% by weight, particularly preferably from 3 to 8% by weight. When the concentration of the crude low-substituted hydroxypropyl cellulose in the slurry is less than 2% by weight, the time necessary for the purification step may increase because of an increase in the amount of the slurry to be subjected to purification treatment. When the concentration is more than 15%, feeing of the slurry through a pump may become impossible. After slurrying, an extraction valve 13 is "opened" and the resulting slurry is fed, while disintegrating the solid component containing low-substituted hydroxypropyl cellulose in the slurry through a cutter pump 1a. It is preferred that after disintegrating, a portion of the slurry is fed to a washing machine 16 through a flow rate control valve 15, while the remaining portion is, after a return valve 17 is made "opened", fed through a circulation flow passage 18 to the vessel such as the slurry tank 12, and then circulated through the cutter pump 1a. Introduction into the washing machine or returning the slurry to the slurry tank for circulation is conducted at a branch point 14. The slurry fed to the washing machine 16 is filtered into a cake. Hot washing water is then sprayed on this cake, followed by filtration and washing again. Then, the cake thus washed is subjected to compression by a continuous press.

In the vessel such as the slurry tank 12, a sedimentation phenomenon of particles of the solid component containing the low-substituted hydroxypropyl cellulose occurs readily due to gravity, which may lead to blocking of pipes such as slurry extraction pipe. In order to prevent blocking of pipes, it is preferred to employ either one of the method of stirring inside the vessel such as a slurry tank 12 by using a stirring apparatus 11 or the like to form a uniform dispersion state and the method of making the return valve 17 "opened" and circulating, by a pump, the slurry through the circulation flow passage 18, while keeping the uniform dispersion state.

In particular, cellulose excellent in water retention such as low-substituted hydroxypropyl cellulose tends to spend much time for completing the treatment of the total amount of the slurry in a purification step (washing and, optional dehydration and/or optional compression). It is therefore preferred to keep the uniform dispersion state in the system until completion of the treatment in the purification step.

When stirring with a mixer or the like is conducted to keep the uniform dispersion state in the system, it is preferred to stir under stirring conditions permitting formation of the uniform dispersion state of the slurry with minimum power. An excessive increase in the power is not preferred because a shear force produced by stirring may excessively disintegrate the particles of the solid component containing the low-substituted hydroxypropyl cellulose.

In the system in which a slurry is circulated, the average particle size of the solid component containing low-substituted hydroxypropyl cellulose in the vessel such as a slurry tank 12 can be regulated by adjusting the cutter pump operation time using the cutter pump 1a and changing the frequency of disintegration caused by the passage through the pump.

It is also possible to make the return valve 17 "closed" and feed all the amount of the slurry discharged by the cutter pump 1a to the washing machine 16 through the flow rate control valve 15. When the treatment rate of the washing machine may change with the passage of time as in the invention, however, it is difficult to carry out continuous washing by regulating the discharge amount of the pump and the treatment rate of the washing machine. In addition, depending on the treatment capacity of the washing machine, the discharge amount of the slurry by the pump becomes excessive, which may prevent continuous washing. In such cases, for example, a tank (not shown) for temporarily storing the slurry therein may be provided between the flow rate control valve 15 and the washing machine 16 to keep continuous washing.

The average particle size of the solid component containing the crude low-substituted hydroxypropyl cellulose in the slurry to be supplied to the cutter pump is preferably from 2.5 to 6.0 mm, particularly preferably from 3.0 to 4.0 mm. When the average particle size is less than 2.5 mm, there is a possibility of the particles of the solid component being disintegrated excessively by the disintegration with a cutter pump, depending on the operation conditions such as the amount of the slurry in the vessel such as a slurry tank, a discharge amount of the cutter pump, or treatment rate of the washing machine; and the filtration resistance in the purification step becomes large, which may increase the time of the purification step. When the average particle size is more than 6.0 mm, the proportion of coarse particles in the solid component may increase so that it may become difficult to extract and remove a yellowing-causing substance from the solid component in the purification step.

It should be noted that an average particle size of the solid component containing the low-substituted hydroxypropyl cellulose in the slurry is expressed by a particle size at 50% in cumulative weight-based particle size distribution determined by the sieve method.

As the cutter pump, a pump characterized by having all of the functions of disintegrating, mixing, dispersing and conveying a solid component is preferably used.

The flow rate of the slurry discharged from the cutter pump varies largely depending on the amount of the slurry in the vessel such as a slurry tank and the treatment rate of the washing machine. The linear velocity of the slurry obtained by dividing the flow rate of the slurry running through a pipe by the cross-sectional area of the pipe is preferably from 0.2 to 5.0 m/s, particularly preferably from 0.5 to 2.0 m/s. When the linear velocity is less than 0.2 m/s, the diameter of the pipe may have to be increased greatly to secure a predetermined flow rate, but precipitation may occur in the pipe, depending on the specific gravity of the slurry. When the linear velocity is more than 5.0 m/s, an industrially stable operation may be prevented.

In order to improve the extraction and removal abilities of a yellowing-causing substance from the solid component in the purification step, it is necessary for the solid component containing the low-substituted hydroxypropyl cellulose in the slurry to pass through the cutter pump at least once on average for disintegration. When the slurry is circulated, the average frequency of the solid component containing the low-substituted hydroxypropyl cellulose in the slurry passing through the cutter pump can be regulated by the operation conditions such as the amount of the slurry in the vessel such as a slurry tank, and the discharge amount and discharge time of the cutter pump.

The solid particles containing low-substituted hydroxypropyl cellulose may be excessively miniaturized by the disintegration through the cutter pump in the middle of the purification step, depending on operation conditions such as the amount of the slurry in the vessel such as a slurry tank, the discharge amount of the cutter pump, or the treatment rate of the washing machine. One or more, preferably one or two rotary pumps are installed in the system to prevent excessive miniaturization of the particles.

The disintegrating step preferably comprises disintegrating the slurry containing the low-substituted hydroxypropyl cellulose introduced from the slurry tank for storing the slurry by using the cutter pump; and discharging the slurry containing the disintegrated solid component to the washing machine or the like, or returning the slurry to the slurry tank for circulation. An average particle size of the disintegrated crude low-substituted cellulose ether to be introduced into the washing machine or the like can be regulated by providing a cutter pump bypass flow passage which enables the slurry to go around the cutter pump and thereby controlling the disintegration frequency through the cutter pump.

Introduction of the slurry into the bypass flow passage is driven by a rotary pump provided preferably between the slurry tank and the cutter pump, and/or between the cutter pump and a branch point at which the slurry is introduced into the washing machine to be used in the washing step, or the slurry is returned to the slurry tank for circulation.

In addition, by preferably providing a rotary bypass flow passage which enables the slurry to go around the rotary pump, the treatment frequency through the rotary pump can be regulated to control the average particle size of the disintegrated low-substituted cellulose ether to be discharged into the washing machine or the like. This rotary bypass flow passage is provided because the rotary pump does not give an excessive shear force to the solid component containing the low-substituted hydroxypropyl cellulose and therefore miniaturization of the solid particles can be suppressed, but miniaturization of the particles by the rotary pump cannot be denied completely.

Figure 2:
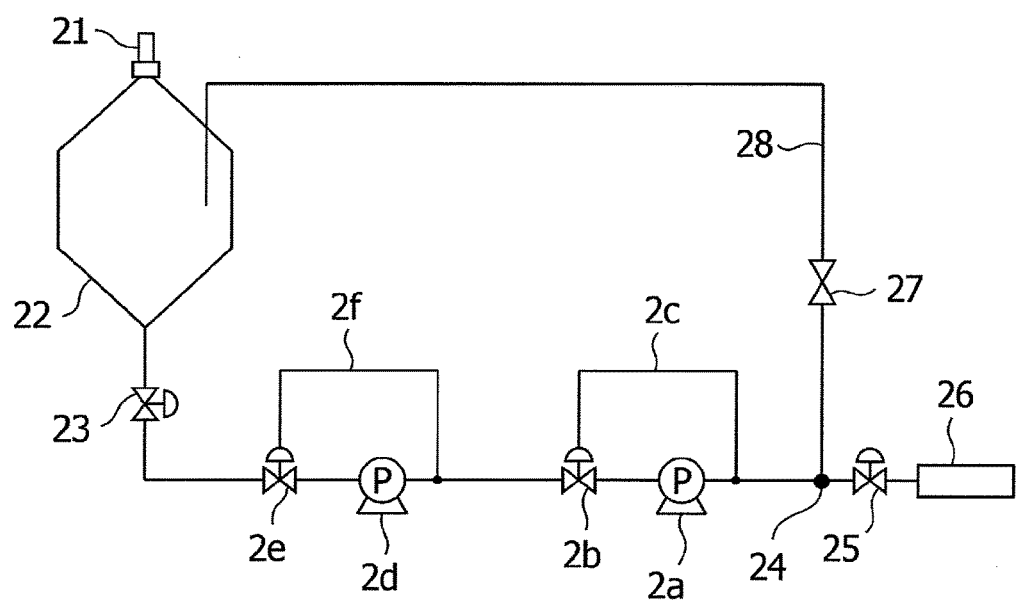
FIG. 2 is a schematic view showing another embodiment of an apparatus for producing purified low-substituted hydroxypropyl cellulose according to the invention.

A combination embodiment of a cutter pump and a rotary pump is shown in FIG. 2. In this embodiment, the rotary pump is placed downstream of the slurry tank but upstream of the cutter pump.

After neutralization of the whole alkali metal hydroxide solution, the crude low-substituted hydroxypropyl cellulose is dispersed in water for slurrying in a vessel such as a slurry tank 22 to obtain a slurry. After slurry formation, an extraction valve 23 is made "opened", a piping passage switching valve 2e is switched to allow the slurry to pass through a rotary pump bypass flow passage 2f, and at the same time, a piping passage switching valve 2b is switched to allow the slurry to pass through a cutter pump 2a. Then, the slurry is fed, while disintegrating the solid component containing the low-substituted hydroxypropyl cellulose in the slurry through the cutter pump 2a.

It is preferred to feed a portion of the slurry, having the solid component containing the low-substituted hydroxypropyl cellulose disintegrated through the cutter pump 2a, to a washing machine 26 through a flow rate control valve 25; and to feed the remaining portion, after a return valve 27 is made "opened", to the vessel such as a slurry tank 22 through a circulation flow passage 28 for circulation through the cutter pump 2a. The introduction into the washing machine or the return to the slurry tank for circulation is conducted at a branch point 24.

When the slurry is circulated through the slurry tank, there is a possibility of the solid component containing the low-substituted hydroxypropyl cellulose which has passed through the cutter pump 2a at least once on average being excessively miniaturized as a result of disintegration in the cutter pump 2a. In order to suppress miniaturization, it is preferred to switch the piping passage switching valve 2e to allow the slurry to pass through a rotary pump 2d and at the same time to switch the piping passage switching valve 2b to allow the slurry to pass through a cutter pump bypass flow passage 2c; and after switching, to feed the slurry in the system by using the rotary pump 2d.

It is preferred to feed a portion of the slurry, having been fed through the rotary pump 2d, through the flow rate control valve 25 to the washing machine 26; and to feed the remaining portion through the circulation flow passage 28 to the vessel such as a slurry tank 22 for circulation through the rotary pump 2d.

The slurry fed to the washing machine 26 is filtered into a cake. Similar to the cake described above, the cake is subjected to spray of hot water for washing, filtered again, and washed. The cake thus washed is subjected to compression in a known manner.

It is also possible to make the return valve 27 "closed" at the time of feeding the slurry to the cutter pump 2a or the rotary pump 2d and to feed the total amount of the slurry, which has been discharged by the pump, through the flow rate control valve 25 to the washing machine. In the case where the treatment rate of the washing machine changes with the passage of time as in the invention, however, it is difficult to continuously wash the slurry, while regulating the discharge amount of the pump and the treatment rate of the washing machine. In addition, depending on the treatment capacity of the washing machine, the discharge amount of the slurry by the pump becomes excessive so that continuous washing is prevented. In such cases, continuous washing may be maintained by providing a tank (not shown) for temporarily storing the slurry therein between the flow rate control valve 25 and the washing machine 26.

It is also possible to feed the slurry through the cutter pump 2a and the rotary pump 2d in series by switching the piping passage switching valves 2b and 2e. However, in this case, attention should be paid to the possibility of the solid particles containing the low-substituted hydroxypropyl cellulose being miniaturized as a result of disintegration by the cutter pump.

It is also possible to produce low-substituted hydroxypropyl cellulose by reversing the positions of the cutter pump 2a and the rotary pump 2d to place the rotary pump 2d downstream of the cutter pump 2a but upstream of a branch point 24 at which the slurry is introduced into the washing machine 26 or the slurry is returned to the slurry tank 22 for circulation.

As the rotary pump in the invention, a volume pump having a quantitative property is used. Different from a centrifugal pump, this pump does not give an excessive shear force to the solid component containing the low-substituted hydroxypropyl cellulose, so that miniaturization of the solid particles containing the low-substituted hydroxypropyl cellulose can be suppressed.

The flow rate of the slurry discharged from the rotary pump varies greatly depending on the amount of the slurry in the vessel such as a slurry tank and the treatment rate of the washing machine. The linear velocity of the slurry obtained by dividing the flow rate of the slurry running in the pipe by the cross-sectional area of the pipe is preferably from 0.2 to 2.5 m/s, particularly preferably from 0.5 to 1.8 m/s. When the linear velocity is less than 0.2 m/s, the diameter of the pipe should be made considerably greater in order to secure a predetermined flow rate, so that precipitation may occur in the pipe, depending on the specific gravity of the slurry. When the linear velocity is more than 2.5 m/s, there is an undesirable possibility of the particles of the solid component containing the low-substituted hydroxypropyl cellulose being miniaturized due to an excessive shear force caused by a turbulent flow in the pipe.

In particular, when the rotary pumps are placed upstream and downstream of the cutter pump, a shear force applied to the particles of the solid component containing the low-substituted hydroxypropyl cellulose during discharges from the rotary pumps becomes greater compared with that for the case where only one rotary pump is placed. Consequently, when the slurry is discharged from the rotary pumps, there is a higher possibility of the particles of the solid component containing the low-substituted hydroxypropyl cellulose being miniaturized.

When two or more rotary pumps are placed in the system, the rotary pumps preferably have the same characteristics. When rotary pumps different in characteristics are placed, it may undesirably cause normal rotation reverse flow or shutoff operation, depending on the operation conditions.

Figure 3:
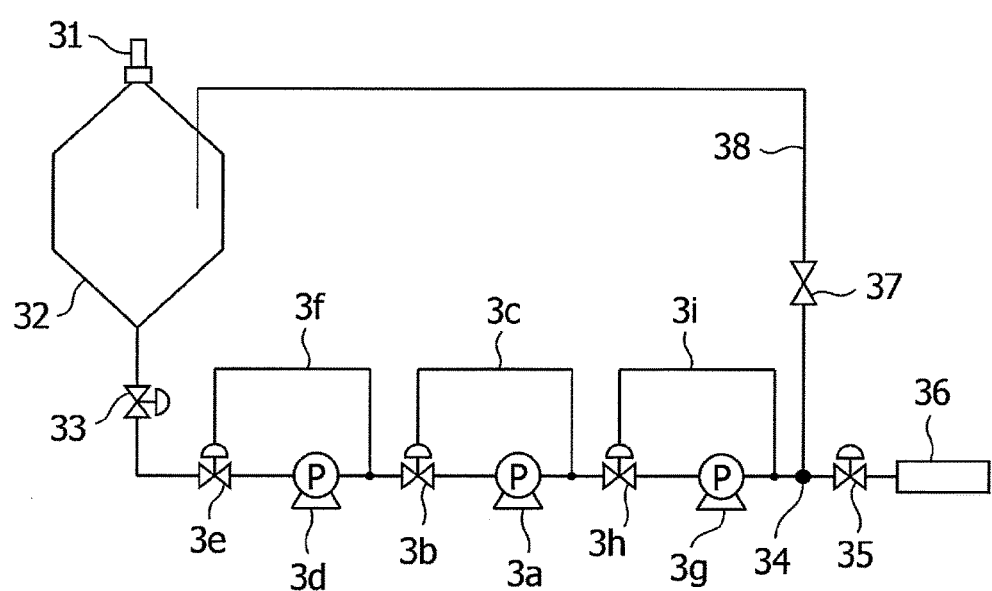
FIG. 3 is a schematic view showing a further embodiment of an apparatus for producing purified low-substituted hydroxypropyl cellulose according to the invention.

A combination embodiment of one cutter pump and two rotary pumps is shown in FIG. 3. The rotary pumps may be placed downstream of the slurry tank and upstream of the cutter pump, and downstream of the cutter pump and upstream of a branch point at which the slurry is introduced into washing machine or returned to the slurry tank for circulation. The following is a detailed description with respect to the rotary pumps placed upstream and downstream of the cutter pump.

The crude low-substituted hydroxypropyl cellulose after neutralization of the whole alkali metal hydroxide solution is dispersed in water for slurrying in a vessel such as a slurry tank 32 to obtain a slurry.

After the slurry is obtained, an extraction valve 33 is made "opened", piping passage switching valves 3e and 3h are switched to allow the slurry to path through rotary pump bypass flow passages 3f and 3i, and at the same time, a piping passage switching valve 3b is switched to allow the slurry to pass through a cutter pump 3a. The slurry is then fed, while the solid component containing the low-substituted hydroxypropyl cellulose in the slurry is disintegrated through the cutter pump 3a.

It is preferred to feed a portion of the slurry, having been subjected to disintegration of the solid component containing the low-substituted hydroxypropyl cellulose through in the cutter pump 3a, to a washing machine 36 through a flow rate control valve 35; and to feed the remaining portion, after a return valve 37 is made "opened", to the vessel such as a slurry tank 32 through a circulation flow passage 38 for circulation of the slurry by the cutter pump 3a. Introduction into the washing machine or the return to the slurry tank for circulation with respect to the slurry is conducted at a branch point 34.

The solid component containing the low-substituted hydroxypropyl cellulose, having passed through the cutter pump 3a at least once during the purification step, may be miniaturized excessively due to disintegration through the cutter pump 3a. In order to suppress this miniaturization, the piping passage switching valves 3e and 3h are switched to allow the slurry to pass through rotary pumps 3d and 3g and at the same time, the piping passage switching valve 3b is switched to allow the slurry to pass through a cutter pump bypass flow passage 3c. After switching, it is preferred to feed the slurry in the system through two rotary pumps.

It is preferred to feed a portion of the slurry fed through the rotary pumps 3d and 3g to the washing machine 36 through the flow rate control valve 35, and to feed the remaining portion to the vessel such as a slurry tank 32 through the circulation flow passage 38 for circulation by the rotary pumps 3d and 3g.

The slurry fed to the washing machine 36 is filtered to obtain a cake. In a similar manner to that described above, the cake is subjected to spray of hot washing water, filtrated again and washed. Then, the cake thus washed is subjected to compression in a known manner.

It is also possible to make the return valve 37 "closed" during feeding of the slurry by the cutter pump 3a or by the rotary pumps 3d and 3g, and to feed the total amount of the slurry, having been discharged by the pump or pumps, through the flow rate control valve 35 to the washing machine. However, in the case where the treatment rate of the washing machine changes with the passage of time as in the invention, it is difficult to continuously wash the slurry by regulating the discharge amount by the pump or pumps and the treatment rate of the washing machine 36. In addition, depending on the treatment capacity of the washing machine, the discharge amount of the slurry by the pump or pumps becomes excessive so that continuous washing is prevented. In such cases, continuous washing may be maintained by providing a tank (not shown) for temporarily storing the slurry therein between the flow rate control valve 35 and the washing machine 36.

It is also possible to switch the piping passage switching valves 3b, 3e and 3h for allowing the slurry to pass through the cutter pump 3a and the rotary pumps 3d and 3g in series. In this case, however, attention should be paid to the possibility of the solid particles containing low-substituted hydroxypropyl cellulose being miniaturized as a result of disintegrating by the cutter pump.

When one or more rotary pumps are provided in the system, the average particle size of the solid component containing the low-substituted hydroxypropyl cellulose in the slurry to be supplied to the rotary pump after passage through the cutter pump is preferably from 1.5 to 2.4 mm, particularly preferably from 1.8 to 2.1 mm. When the average particle size is less than 1.5 mm, the particles of the solid component containing the low-substituted hydroxypropyl cellulose may be miniaturized due to discharge of the slurry through the rotary pump, so that the resistance during filtration may be increased, thereby increasing the purification time. When the average particle size is more than 2.4 mm, disintegration of the solid component by the cutter pump may be insufficient, so that extraction and removal of a yellowing-causing substance from the solid component during the purification step may be insufficient.

The average particle size of the solid component containing the crude low-substituted hydroxypropyl cellulose in the slurry to be introduced into the washing step after the disintegration step through the cutter pump is preferably from 1.0 to 2.4 mm, particularly preferably from 1.6 to 2.1 mm. When the average particle size is less than 1.0 mm, the solid component containing the low-substituted hydroxypropyl cellulose, having been miniaturized, may increase the resistance during filtration, thereby increasing the filtration time. When the average particle size is more than 2.4 mm, disintegration of the solid component by the cutter pump may be insufficient, so that extraction and removal of a yellowing-causing substance from the solid component during the purification step may be insufficient.

The slurry containing the low-substituted hydroxypropyl cellulose, discharged after the disintegration step through the cutter pump, is washed with water in the washing step. For example, the slurry is sent to a washing machine, and filtered to obtain a cake, which is then subjected to spray of hot washing water, filtered again and washed. The washing machine is not particularly limited insofar as it can conduct filtration operation and spraying operation of hot washing water successively. A washing machine equipped with a vacuum filtration device is preferred. The temperature of the hot washing water to be sprayed is preferably from 60 to 100° C. When the temperature of the hot water is less than 60° C., the low-substituted hydroxypropyl cellulose swells so that smooth washing may be difficult.

The cake thus washed is optionally subjected to dehydration and/or compression in a known manner. As for the dehydration, a continuous centrifugal filter can be preferably employed. As for the compression, a continuous press can be preferably employed. The continuous press is not particularly limited insofar as it can press the cake continuously.

The cake after washing or compression is dried in a drying step. The cake is dried preferably by using a drier. The heat source of the drier is not particularly limited insofar as the cake can be dried continuously. The cake is dried preferably at a temperature of from 60 to 100° C. When the drying temperature is less than 60° C., it may take a long drying time. When the drying temperature is more than 100° C., the dried low-substituted hydroxypropyl cellulose may become yellow due to excessive heat. After drying, optional pulverization is conducted to produce purified low-substituted hydroxypropyl cellulose.

EXAMPLES

The invention will hereinafter be described in detail by Examples and Comparative Examples. However, it should not be construed that the invention is limited to or by Examples.

Example 1

A reaction vessel having an internal stirring structure was charged with powdery pulp. Under stirring conditions, an aqueous 35% by weight sodium hydroxide solution was added thereto for 6 minutes. Stirring was continued for further 20 minutes to produce alkali cellulose comprising 15.0% by weight of sodium hydroxide, 54.3% by weight of cellulose and 30.7% by weight of water.

The reaction vessel was then purged with nitrogen. After the nitrogen purge, relatively to 100 parts by weight (14.7 kg) of the alkali cellulose, 9.8 parts by weight of propylene oxide was added while keeping the reaction vessel at 60° C. and an etherification reaction was conducted for 90 minutes to obtain 109.8 parts by weight of a crude reaction product. After the reaction vessel was purged with nitrogen, the crude reaction product was taken out therefrom.

A biaxial kneader was charged with 277 parts by weight of warm water of 40° C. and 3.1 parts by weight of an aqueous 33% by weight acetic acid solution, and then 100 parts by weight of the crude reaction product was dispersed therein. Next, a portion of the crude reaction product was neutralized by mixing for 10 minutes while keeping the temperature at 40° C. Then, 58.9 parts by weight of an aqueous 33% by weight acetic acid solution was added over a period of eight minutes while keeping the same temperature. Mixing was conducted until the acetic acid became uniform, and the reaction product was precipitated as 8.96 kg of precipitate.

A test was then conducted using an apparatus having the structure as shown in FIG. 1.

The slurry tank 12 was charged with 100 parts by weight (8.96 kg) of the precipitate and the precipitate was dispersed in 123.2 parts by weight of water of 60° C. for slurrying so as to obtain a 5.0% by weight slurry of the crude low-substituted hydroxypropyl cellulose by using the stirrer 11.

The average particle size of the solid component containing the crude low-substituted hydroxypropyl cellulose in the slurry was 3.5 mm when measured as a particle size at 50% in cumulative weight-based particle size distribution determined based on a ratio of the solid component containing the crude low-substituted hydroxypropyl cellulose passing through the openings of five sieves, each having a different opening size.

After slurry was formed, the extraction valve 13 was made "opened" and the slurry was fed through the cutter pump 1a (product of Sanwa Hydrotech Corp.), while disintegrating the solid component containing the low-substituted hydroxypropyl cellulose in the slurry. The flow rate during feeding of the slurry by the cutter pump 1a was 0.00056 m$^3$/s and the linear velocity of the slurry was 0.93 m/s.

After disintegration, the slurry was partially fed to the washing machine 16 through the flow rate control valve 15. The return valve 17 was made "opened" and the remaining slurry was fed to the slurry tank 12 through the circulation flow passage 18 and then circulated through the cutter pump 1a.

The slurry fed to the washing machine 16 was washed by continuously conducting filtration and spray of hot washing water. When feeding of 90% of the total amount of the slurry to the washing machine was completed, the average particle size of the solid component containing the low-substituted hydroxypropyl cellulose in the slurry discharged from the cutter pump 1a was 1.2 mm.

In order to estimate the time necessary for the purification step, when feeding of 90% of the total amount of the slurry to the washing machine was completed, the time spent for filtering the slurry discharged from the cutter pump 1a was evaluated. A suction flask connected to a vacuum pump was fitted with a glass filter holder having a nylon filter (145 mesh) inserted therebetween. Next, 160 g of the slurry controlled to a temperature of 60° C. was added into a funnel part of the filter holder, and time until the suction filtration of the slurry resulted in 80 g of filtrate was measured to be 300 seconds. In addition, the degree of vacuum was measured using a manometer and it was −6.0 kPa.

The slurry was washed, subjected to compression, dried in an air drier, pulverized in a high-speed rotating impact-type pulverizer, and classified by using a sieve to obtain a low-substituted hydroxypropyl cellulose powder.

As a confirmation test of the yellowing of the low-substituted hydroxypropyl cellulose powder, the low-substituted hydroxypropyl cellulose powder was charged in a cell and the yellowness index on the powder surface was measured using an SM color computer "SM-T" (product of Suga Test Instruments) to be 8.3.

Example 2

The crude reaction product of low-substituted hydroxypropyl cellulose ether was obtained in the same manner in Example 1.

Next, 277 parts by weight of warm water of 40° C. and 3.1 parts by weight of an aqueous 33% by weight acetic acid solution were charged in a biaxial kneader. The crude reaction product (100 parts by weight, 32.7 kg) was dispersed therein. Then, a portion of the crude reaction product was neutralized for 10 minutes, while keeping the temperature at 40° C. Then, 58.9 parts by weight of an aqueous 33% by weight acetic acid solution was added over 10 minutes while keeping the same temperature. Until the acetic acid became homogeneous, they were mixed for 10 minutes to precipitate a reaction product. As a result, 143.4 kg of precipitate was obtained.

A test was conducted using an apparatus having a structure as shown in FIG. 2.

The slurry tank 22 was charged with 100 parts by weight (143.4 kg) of the precipitate and the crude low-substituted hydroxypropyl cellulose was dispersed in 123.2 parts by weight of water of 60° C. for slurrying by using a stirring apparatus 21 to obtain a 5.0% by weight slurry.

The average particle size of the solid component containing the crude low-substituted hydroxypropyl cellulose was measured in the same manner as in Example 1. It was 3.5 mm.

After slurry was formed, the extraction valve 23 was made "opened" and the piping passage switching valve 2e was switched so as to allow the slurry to pass through the rotary pump bypass flow passage 2f and at the same time, the piping passage switching valve 2b was switched to allow the slurry to pass through the cutter pump 2a. Then, the slurry was fed while disintegrating the solid component containing the low-substituted hydroxypropyl cellulose in the slurry through the cutter pump 2a. The flow rate during feeding by the cutter pump 2a was 0.00069 m$^3$/s and the linear velocity of the slurry was 1.16 m/s.

A portion of the slurry after disintegration was fed to the washing machine 26 through the flow rate control valve 25. After the return valve 27 was made "opened", the remaining slurry was fed to the slurry tank 22 through the circulation flow passage 28, followed by circulation of the slurry by the cutter pump 2a.

After the slurry was circulated for 30 minutes though the cutter pump 2a, the piping passage switching valve 2e was switched to allow the slurry to pass through the rotary pump 2d (product of Nakakin Co., Ltd.). At the same time, the piping passage switching valve 2b was switched to allow the slurry to pass through the cutter pump bypass flow passage 2c. Then, the slurry was fed by the rotary pump 2d.

The average particle size of the solid component containing the crude low-substituted hydroxypropyl cellulose in the slurry discharged from the rotary pump 2d immediately after switching to feed by the rotary pump 2d was 1.9 mm.

A portion of the slurry fed by the rotary pump 2d was fed to the washing machine 26 through the flow rate control valve 25. The remaining slurry was fed to the slurry tank 22, passing through the circulation flow passage 28, and then circulated by the rotary pump 2d.

The flow rate during feeding by the rotary pump 2d was 0.00064 m$^3$/s and the linear velocity of the slurry was 1.07 m/s.

The slurry fed to the washing machine 26 was washed by successively conducting filtration and spray of hot washing water. The average particle size of the solid component containing the low-substituted hydroxypropyl cellulose in the slurry discharged from the rotary pump 2d when feeding of 90% of the total amount of the slurry to the washing machine was completed was 1.6 m.

When feeding of 90% of the total amount of the slurry to the washing machine was completed, the time spent for filtering the slurry discharged from the rotary pump 2d was measured in the same manner as in Example 1. It was 230 seconds and the degree of vacuum was −5.8 kPa.

The yellowness index on the surface of the low-substituted hydroxypropyl cellulose powder was measured using an SM color computer "SM-T" (product of Suga Test Instruments) to be 8.0.

Example 3

The slurry containing crude low-substituted hydroxypropyl cellulose-containing slurry was obtained in the same manner as in Example 2.

The average particle size of the solid component containing the crude low-substituted hydroxypropyl cellulose in the slurry was measured in the same manner as in Example 1. It was 3.4 mm.

In the same manner as in Example 2 except that the positional relationship between the rotary pump and the cutter pump in Example 2 was reversed and the rotary pump was placed downstream of the cutter pump, feeding of the slurry was conducted.

The flow rate during feeding by the cutter pump was 0.00064 m$^3$/s and the linear velocity of the slurry was 1.07 m/s.

After circulation of the slurry for 30 minutes through the cutter pump, the pump was switched to passage through the rotary pump and the slurry was fed. The average particle size of the sold component containing the crude low-substituted hydroxypropyl cellulose in the slurry discharged from the rotary pump immediately after switching of the pump was 1.9 mm.

The flow rate during feeding by the rotary pump was 0.00061 m$^3$/s and the linear velocity of the slurry was 1.02 m/s.

When feeding of 90% of the total amount of the slurry to the washing machine was completed, the average particle size of solid component containing the low-substituted hydroxypropyl cellulose in the slurry discharged from the rotary pump was 1.6 mm.

Further, when feeding of 90% of the total amount of the slurry to the washing machine was completed, the time spent for filtering the slurry discharged from the rotary pump was measured in the same manner as in Example 1. It was 220 seconds and the degree of vacuum was −6.2 kPa.

The yellowness index on the surface of the low-substituted hydroxypropyl cellulose powder was measured using an SM color computer "SM-T" (product of Suga Test Instruments) to be 8.1.

Example 4

The slurry containing crude low-substituted hydroxypropyl cellulose was obtained in the same manner as in Example 2. Then, the average particle size of the solid component containing the crude low-substituted hydroxypropyl cellulose in the slurry was measured by using the same apparatus as in Example 1 in the same manner as in Example 1. It was 2.5 mm.

The positional relationship between the rotary pump and the cutter pump was the same as in Example 2, and the same manner as in Example 2 was employed except that the average particle size of the solid component containing crude low-substituted hydroxypropyl cellulose in the slurry to be introduced is smaller than that in Example 2.

The flow rate during feeding of the slurry by the cutter pump was 0.00053 m$^3$/s and the linear velocity of the slurry was 0.88 m/s.

After circulation of the slurry for 20 minutes through the cutter pump, the pump was changed to the rotary pump and the slurry was fed. The average particle size of the solid component containing the crude low-substituted hydroxypropyl cellulose in the slurry discharged from the rotary pump immediately after the change of the pump was 1.6 mm.

The flow rate during feeding of the slurry by the rotary pump was 0.00067 m$^3$/s and the linear velocity of the slurry was 1.11 m/s.

When feeding of 90% of the total amount of the slurry to the washing machine was completed, the average particle size of the solid component containing the low-substituted hydroxypropyl cellulose in the slurry discharged from the rotary pump was 1.3 mm.

Further, when feeding of 90% of the total amount of the slurry to the washing machine was completed, the time spent for filtering the slurry discharged from the rotary pump was measured in the same manner as in Example 1. It was 350 seconds and the degree of vacuum was −6.0 kPa.

The yellowness index on the surface of the low-substituted hydroxypropyl cellulose powder was measured using an SM color computer "SM-T" (product of Suga Test Instruments) to be 8.3.

Example 5

The slurry containing crude low-substituted hydroxypropyl cellulose was obtained in the same manner as in Example 2. An average particle size of the solid component containing the crude low-substituted hydroxypropyl cellulose in the slurry was then measured using the same apparatus and the same manner as in Example 1. As a result, it was 3.7 mm.

Operations subsequent thereto were conducted using an apparatus having a structure as shown in FIG. 3 and a rotary pump having the same characteristics was used.

After slurry was formed, the extraction valve 33 was "opened" and the piping passage switching valves 3e and 3h were switched to allow the slurry to pass through the rotary pump bypass flow passages 3f and 3i and at the same time, the pipe flow passage switching valve 3b was changed to allow the slurry to pass through the cutter pump 3a. Then, the slurry was fed while disintegrating the solid component containing the low-substituted hydroxypropyl cellulose in the slurry through the cutter pump 3a.

After the solid component containing the low-substituted hydroxypropyl cellulose was disintegrated through the cutter pump 3a, a portion of the resulting slurry was fed through the flow rate control valve 35 to the washing machine 36. Then, the return valve 37 was "opened" and the remaining portion of the slurry was fed though the circulation flow passage 38 to the slurry tank 32. The slurry was circulated further by the cutter pump 3a.

The flow rate during feeding by the cutter pump was 0.00061 m$^3$/s and the linear velocity was 1.02 m/s.

After circulation of the slurry for 30 minutes through the cutter pump 3a, the piping passage switching valves 3e and 3h were switched to allow the slurry to pass through the rotary pumps 3d and 3g and at the same time the pipe flow passage switching valve 3b was switched to allow the slurry to pass through the cutter pump bypass flow passage 3c. Then, the slurry was fed through the rotary pumps 3d and 3g.

A portion of the slurry fed through the rotary pumps 3d and 3g was fed through the flow rate control valve 35 to the washing machine 36. The return valve 37 was "opened" and the remaining portion of the slurry was fed through the circulation flow passage 38 to the slurry tank 3 and circulated further through the rotary pumps 3d and 3g.

After switching to feed the slurry by the rotary pumps 3d and 3g, the average particle size of the solid component containing the crude low-substituted hydroxypropyl cellulose in the slurry discharged from the rotary pump 3g immediately was 1.9 mm.

The flow rates during feeding through the rotary pumps 3d and 3g were each 0.00065 m$^3$/s and the linear velocity of the slurry was 1.09 m/s.

The slurry fed to the washing machine 36 was washed by successively conducting filtration and spray of hot washing water.

When feeding of 90% of the total amount of the slurry to the washing machine was completed, the average particle size of the solid component containing the low-substituted hydroxypropyl cellulose in the slurry discharged from the rotary pump 3g was 1.3 mm.

Further, when feeding of 90% of the total amount of the slurry to the washing machine was completed, the time spent for filtering the slurry discharged from the rotary pump 3g was measured in the same manner as in Example 1. It was 380 seconds and the degree of vacuum was −6.0 kPa.

The yellowness index on the surface of the low-substituted hydroxypropyl cellulose powder was measured using an SM color computer "SM-T" (product of Suga Test Instruments) to be 7.8.

Comparative Example 1

The slurry containing crude low-substituted hydroxypropyl cellulose was obtained in the same manner as in Example 1.

The average particle size of the solid component containing the crude low-substituted hydroxypropyl cellulose in the slurry was measured in the same manner as in Example 1. It was 3.1 mm.

The same operations as in Example 1 were conducted by using the same apparatus in Example 1 except that a centrifugal pump was used instead of the cutter pump.

The flow rate during feeding through the centrifugal pump was 0.0013 m$^3$/s and the linear velocity of the slurry was 2.01 m/s.

When feeding of 90% of the total amount of the slurry to the washing machine was completed, the average particle size of the solid component containing the low-substituted hydroxypropyl cellulose in the slurry discharged from the centrifugal pump was 1.1 mm.

Further, when feeding of 90% of the total amount of the slurry to the washing machine was completed, the time spent for filtering the slurry discharged from the centrifugal pump was measured in the same manner as in Example 1. It was 400 seconds and the degree of vacuum measured in the same manner as in Example 1 was −6.1 kPa.

The yellowness index on the surface of the low-substituted hydroxypropyl cellulose powder was measured using an SM color computer "SM-T" (product of Suga Test Instruments) to be 9.1.

Comparative Example 2

The slurry containing crude low-substituted hydroxypropyl cellulose-containing slurry was obtained in the same manner as in Example 1.

The average particle size of the solid component containing the crude low-substituted hydroxypropyl cellulose in the slurry was measured in the same manner as in Example 1. It was 3.0 mm.

The same operations as in Example 1 were conducted using the same apparatus as in Example 1 except for the use of a rotary pump instead of the cutter pump.

The flow rate during feeding through the rotary pump was 0.00067 m$^3$/s and the linear velocity of the slurry was 1.11 m/s.

When feeding of 90% of the total amount of the slurry to the washing machine was completed, the average particle size of the solid component containing the low-substituted hydroxypropyl cellulose in the slurry discharged from the rotary pump was 2.4 mm.

Further, when feeding of 90% of the total amount of the slurry to the washing machine was completed, the time spent for filtering the slurry discharged from the rotary pump was measured in the same manner as in Example 1. It was 210 seconds and the degree of vacuum measured in the same manner as in Example 1 was −6.1 kPa.

The yellowness index on the surface of the low-substituted hydroxypropyl cellulose powder was measured using an SM color computer "SM-T" (product of Suga Test Instruments) to be 9.7.

Comparative Example 3

The slurry containing the crude low-substituted hydroxypropyl cellulose was obtained in the same manner as in Example 3.

The average particle size of the solid component containing the crude low-substituted hydroxypropyl cellulose-containing solid matter in the slurry was measured in the same manner as in Example 1. It was 3.3 mm.

The same operations as in Example 3 were conducted by using the apparatus as in Example 3 except for use of a centrifugal pump instead of the cutter pump.

The flow rate during feeding through the centrifugal pump was 0.0013 m$^3$/s and the linear velocity of the slurry was 2.10 m/s.

After circulation of the slurry for 40 minutes through the centrifugal pump, the pump was switched and the slurry was fed through the rotary pump. The average particle size of the solid component containing the crude low-substituted hydroxypropyl cellulose in the slurry discharged from the rotary pump immediately after switching of the pump was 1.6 mm.

The flow rate during feeding through the rotary pump was 0.00064 m$^3$/s and the linear velocity of the slurry was 1.07 m/s.

When feeding of 90% of the total amount of the slurry to the washing machine was completed, the average particle size of the solid component containing the low-substituted hydroxypropyl cellulose in the slurry discharged from the rotary pump was 1.4 mm.

Further, when feeding of 90% of the total amount of the slurry to the washing machine was completed, the time spent for filtering the slurry discharged from the rotary pump was measured in the same manner as in Example 1. It was 250 seconds. The degree of vacuum measured in the same manner as in Example 1 was −6.0 kPa.

The yellowness index on the surface of the low-substituted hydroxypropyl cellulose powder was measured using an SM color computer "SM-T" (product of Suga Test Instruments) to be 9.5.

TABLE 1

| | feeding through pump | | feeding through pump | | | at the end of washing | estimated time for purification step filtration time at the end of washing (seconds) | powder property yellowness index (−) |
|---|---|---|---|---|---|---|---|---|
| | average particle size before passing through pump (mm) | pump | average particle size before passing through pump (mm) | pump | position of rotary pump | average particle size at the end of washing (mm) | | |
| Example1 | 3.5 | cutter pump | — | — | — | 1.2 | 300 | 8.3 |
| Example2 | 3.5 | cutter pump | 1.9 | rotary pump | before cutter pump | 1.6 | 230 | 8.0 |
| Example3 | 3.4 | cutter pump | 1.9 | rotary pump | after cutter pump | 1.6 | 220 | 8.1 |
| Example4 | 2.5 | cutter pump | 1.6 | rotary pump | after cutter pump | 1.3 | 350 | 8.3 |
| Example5 | 3.7 | cutter pump | 1.9 | rotary pump | before and after cutter pump | 1.3 | 380 | 7.8 |
| Comp. Ex. 1 | 3.1 | centrifugal pump | — | — | — | 1.1 | 400 | 9.1 |
| Comp. Ex. 2 | 3.0 | rotary pump | — | — | — | 2.5 | 210 | 9.7 |
| Comp. Ex. 3 | 3.3 | centrifugal pump | 1.6 | rotary pump | after cutter pump | 1.4 | 300 | 9.5 |

The invention claimed is:

1. A method for producing purified low-substituted hydroxypropyl cellulose, comprising the steps of:
    reacting alkali cellulose and an etherifying agent to obtain a reaction mixture;
    dispersing the reaction mixture in water containing a first portion of acid to neutralize a portion of the reaction mixture, thereby causing partial precipitation, and then completely neutralizing a remaining portion of the reaction mixture with a second portion of the acid to cause precipitation, to obtain a slurry containing crude low-substituted hydroxypropyl cellulose;
    disintegrating a solid component in the slurry through a cutter pump, the solid component containing the crude low-substituted hydroxypropyl cellulose, and discharging the slurry containing the disintegrated solid component, said disintegrated solid component having an average particle size of from 1.0 to 2.4 mm, and wherein the solid component containing the crude low-substituted hydroxypropyl cellulose in the slurry to be fed to the cutter pump has an average particle size of from 2.5 to 6.0 mm;
    washing the discharged slurry with water to obtain a cake of purified low-substituted hydroxypropyl cellulose; and
    drying the cake.

2. The method for producing purified low-substituted hydroxypropyl cellulose according to claim 1, wherein the step of disintegrating further comprises disintegrating the slurry, fed from a slurry tank for storing the slurry containing the crude low-substituted hydroxypropyl cellulose, through the cutter pump, and discharging the slurry containing the disintegrated solid component or returning the slurry to the slurry tank for circulation, wherein an average particle size of the disintegrated low-substituted hydroxypropyl cellulose to be discharged is regulated by controlling the disintegrating frequency through the cutter pump by providing a cutter pump bypass flow passage which enables the slurry to go around the cutter pump.

3. The method for producing purified low-substituted hydroxypropyl cellulose according to claim 2, wherein passage of the slurry through the cutter pump bypass flow passage is driven by a rotary pump provided between the slurry tank and the cutter pump and/or between the cutter pump and a branch point at which the slurry is introduced into a washing machine to be used in the step of washing or the slurry is returned to the slurry tank for circulation.

4. The method for producing purified low-substituted hydroxypropyl cellulose according to claim 3, wherein the rotary pump is provided between the cutter pump and the branch point, and the solid component in the slurry to be fed to the rotary pump after passing through the cutter pump has an average particle size of from 1.5 to 2.4 mm.

5. The method for producing a purified low-substituted hydroxypropyl cellulose according to claim 3, wherein the average particle size of the disintegrated low-substituted hydroxypropyl cellulose to be discharged is regulated by providing a rotary pump bypass flow passage which enables the slurry to go around the rotary pump and thereby controlling the treatment frequency through the rotary pump.

\* \* \* \* \*